United States Patent
Deeds

(10) Patent No.: US 7,203,479 B2
(45) Date of Patent: Apr. 10, 2007

(54) USING A MOBILE STATION FOR PRODUCTIVITY TRACKING

(75) Inventor: Douglas Deeds, Bedford, TX (US)

(73) Assignee: Nokia Corporation (FI)

( * ) Notice: Subject to any disclaimer, the term of this patent is extended or adjusted under 35 U.S.C. 154(b) by 278 days.

(21) Appl. No.: 10/429,292

(22) Filed: May 2, 2003

(65) Prior Publication Data

US 2004/0219928 A1 Nov. 4, 2004

(51) Int. Cl.
*H04M 11/00* (2006.01)

(52) U.S. Cl. .................. 455/407; 455/405; 455/406

(58) Field of Classification Search .............. 455/456.1, 455/456.3, 405, 406, 407
See application file for complete search history.

(56) References Cited

U.S. PATENT DOCUMENTS

| 5,255,183 | A | * | 10/1993 | Katz | 705/30 |
| 5,305,238 | A | * | 4/1994 | Starr et al. | 702/176 |
| 6,185,514 | B1 | * | 2/2001 | Skinner et al. | 702/188 |
| 6,581,025 | B2 | * | 6/2003 | Lehman | 702/178 |
| 2001/0042032 | A1 | * | 11/2001 | Crawshaw et al. | 705/32 |
| 2004/0209595 | A1 | * | 10/2004 | Bekanich | 455/405 |

* cited by examiner

*Primary Examiner*—Barry Taylor
(74) *Attorney, Agent, or Firm*—Banner & Witcoff, Ltd.

(57) ABSTRACT

A system and method for tracking productivity using a portable communication device such as a mobile station. The mobile station includes a memory storage unit for storing information related to project profiles. When a communication activity is initiated a timer is started to measure the amount of time that the activity consumes, and queries an activity table to determine whether an identifier associated with the activity has a profile association. If so, an event record is made of the profile and the type of communication activity. When the activity is terminated, the event record is supplemented with the duration of the activity. If there is no profile associated with an activity identifier associated with a current activity, then the user may be queried to determine whether an association should be created. The event records may be loaded onto a PC for storage for further processing or to a report generating device for the generation of an appropriate report.

16 Claims, 4 Drawing Sheets

USING A MOBILE STATION FOR PRODUCTIVITY TRACKING

FIELD OF THE INVENTION

The present invention relates generally to the field of mobile telephony, and more specifically to a method and apparatus for implementing a personal productivity tracking system on a mobile station.

BACKGROUND OF THE INVENTION

Wireless mobile stations are coming into popular use in modem society. Originally quite expensive, both to acquire and to operate, they were often used only where no wireline telephone was readily available. As the supporting technology improved, however, they became both more affordable and more prevalent. Now they are a staple of communication for both personal and business use. Mobile-station users, sometimes referred to as subscribers, often resort to using them while traveling, and can be seen placing telephone calls on mobile stations where once they would be lined up at pay phones for the same purpose. Calls can even be made while riding on a bus, in a car, or walking from one place to another. Many subscribers even plan for making certain calls while out of the office or on the road. For better or for worse, a great deal of business can in this way be transacted during what used to be referred to as 'down time'.

Mobile telephones are, generally speaking, portable radios having both a transmitter and a receiver. Radio communication uses electromagnetic radio waves to send information from one station to another. For voice communications, a microphone on the telephone picks up the user's voice so that it can be converted into radio waves and transmitted. These radio waves start in a standard form, but are then modulated, or changed in a way that a receiver can analyze them and convert the information thus carried into recognizable sounds.

In the case of a cellular-telephone type mobile station, the receiver is typically a nearby base station. The base station has an antenna and a transceiver for transmitting and receiving radio signals, and is connected to a base station controller that controls its operation. The base station controller is in turn connected to a communication network infrastructure, which includes interconnected switching equipment that routes calls from one point in the network to another. The various network nodes may be connected for example by wire, optical fiber, infrared or microwave transmission, or any combination of media. These interconnected base stations can therefore be accessed by network subscribers over a wide geographic area, often called the coverage area.

Calls from one network mobile station to another can be terminated using only network equipment, assuming they are both within the network coverage area. Calls to or from subscribers located out of the coverage area may be made through another network if it is both available and compatible. Separate communication networks connect to each other through common nodes that are often referred to as gateways. Not all networks are mutually connected of course, so a call may have to be routed through a number of them before its termination at the called station. In this way, however, a mobile station may be used to communicate with almost any other generally-accessible communication station.

At this point, it is noted that mobile stations are sometimes referred to as radio telephones, cellular (or cell) phones, and mobile phones. As these terms are often used interchangeably, they will be treated as equivalent herein. They are, however, a sub-group of a larger family of devices that also includes, for example, certain portable computers and personal digital assistants (PDAs) that are also capable of wireless communication. This family of devices will for convenience be referred to as "mobile stations" (regardless of whether a particular device is actually moved about in normal operation).

FIG. 1 is an illustration of a typical mobile station, in this case a mobile telephone 100. Mobile phone 100 has internal circuitry (not shown) housed in an enclosure 101. Antenna 126 extends outward from the top of enclosure 101, and battery 124 is attached to the back. Several openings are formed in enclosure 101, including a plurality of small openings 142 that serve as a port for the speaker (not shown), which is mounted beneath them. At the opposite end, microphone port 144 likewise permits entry of sound directed at the actual microphone (also not shown) mounted inside. The power port 146 is for plugging in an external power adaptor and headphone port 148 is for connecting an external headset and perhaps a microphone for hands-free operation.

The keypad 110 is a user interface including a plurality of openings, through which protrude keys such as alphanumeric keys 111, call control keys 112 and 113, scroll key 114 and function keys 115 and 116. The function of the function and scroll keys are variable and determined by the application state that the mobile phone is in, which is translated into a word or icon displayed next to the key on display 134. A is volume control 117 is used to control speaker volume, and power switch 119 is used to turn the phone 100 on and off.

Display 134 is typically a liquid-crystal display (LCD) device. The LCD itself is protected by a plastic window pane 132, which is mounted to cover the display and protrude into window 130, an opening formed in front of enclosure 101. As illustrated in FIG. 1, display 134 presents to the user such information as current softkey functions, telephone numbers, signal strength, and other information useful to the operation being performed. In fact, the larger displays now available on mobile stations (of which display 134 is a relatively modest example) permit the display no only of copious telephone-related information, but may also accommodate Web pages and word-processing documents.

Traditionally, telephone calls are simply the transmission of voice information from one phone to another. Other information, however, can now be transmitted and received by mobile stations as well; information such as text messages, email messages, faxes, and graphic images. Non-voice information is for convenience often simply referred to as 'data'. (The term 'information' or 'traffic' generally includes both voice and data.) Data transmission is accomplished in a fashion similar to that for voice, although the requirements for its accuracy and timeliness are somewhat different.

This ability to transmit different types of information for different purposes has itself contributed to the rapidly increasing use of mobile stations in business. In fact, they are many times used from homes or offices where other, more traditional instruments for communication are readily available. In part, of course, this practice may take advantage of the mobile station's mobility; a conversation that begins when the subscriber is at home may continue on the way to work and finish at the office. There is no interruption involved in going from one place to another. As another example an Internet-based research project begun in the office may continue as the subscriber waits in front of an office building for a ride to lunch.

One disadvantage that may be encountered in this mobile lifestyle, however, may lie in trying to keep track of the work that has been done. In the traditional office, a worker toiled from nine to five at a desk, often under the watchful eye of a supervisor. The supervisor made sure the worker was there and that the work was done. Even were the worker is not under direct supervision, the need for some accountability may still exist. Many professions, for example, bill customers according to the amount of time spent working on a given project. Others may simply want to determine what their most profitable projects are, determined as a function of how much they are being paid compared with the actual time spent on a project. Or a person may simply keep track of how much time is spent on given projects as a productivity tool, to make sure they are spending most of their time on important tasks, and less on administration. While keeping track of working time is difficult enough when sitting at a desk, it may be nearly impossible when the work is done in transit from one location to another.

Various solutions are available, including simply writing down accomplishments made en route on a piece of paper or in a notebook brought along for the purpose. The same notation could be made on a PDA or digital pager that allows the typing or writing of notes that can be stored on the device itself or sent by email to an address from which it can be later retrieved. A PDA might even be equipped with a timer that could be used in lieu of manually recording start and stop times for later calculation of elapsed time. All of these solutions have a common disadvantage, however, that being the manner in which they require active user initiation. The subscriber that is already engaged in a work-related task may well also be busy boarding a bus, trying to catch an airplane, or watching for traffic. Having to both remember to make notes, and actually going to the trouble of doing it, may simply result in the omission of any productivity tracking. The user may decide instead to try and remember what has been accomplished and to record it later, but they forget when the time comes to do so.

Needed, therefore, is a way to reliably track the many tasks performed while in transit so that the user's memory does not have to be unduly taxed. The present invention provides just such a solution.

SUMMARY OF THE INVENTION

The present is directed at providing a manner in which today's mobile workers can more efficiently and accurately track their time and other productivity-related data as they conduct their business in multiple locations. In one aspect, the present invention is a method of tracking productivity using a mobile station including the steps of establishing project profiles associated with one or more projects that the worker may be engaged in, associating items and events with one or more of these project profiles, detecting the occurrence of a trackable event, collecting data relating to the event, and creating an activity record to be stored on the mobile station or on a remote database. The method may further include the transmission of some or all activity records from the mobile station and generating reports based on the stored activity records.

In another aspect, the present invention is an improved mobile station having a database for storing project profiles and directory and calendar information, and for storing information regarding the relationship between the items, or events relating to them, and the stored project profiles. The mobile station further includes a detector for detecting when a trackable event is occurring and a controller for monitoring the accumulation of event-related data and creating an activity record. The mobile station may further include an external device interface, such as a cable connector port, and infrared communication system, or a short range radio communication system. Be connecting with an external device the mobile station may, at the direction of the user or automatically, transfer activity records and reports based on them to other devices.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 4, discussed herein, and the various embodiments used to describe the present invention are by way of illustration only, and should not be construed to limit the scope of the invention. Those skilled in the art will understand the principles of the present invention may be implemented in any similar radio-communication device, in addition to those specifically discussed herein.

The present invention is a productivity method and system for use in a mobile station to facilitate efficient productivity tracking for the mobile worker. Many such workers today are becoming increasingly dependent on their mobile stations to conduct business, and as a result conduct a great deal of business while out of the office and in transit from one location to another. The present invention, although requiring modest modifications to existing mobile stations and peripheral equipment, requires very little effort for adoption by the mobile station user.

Figure 1:
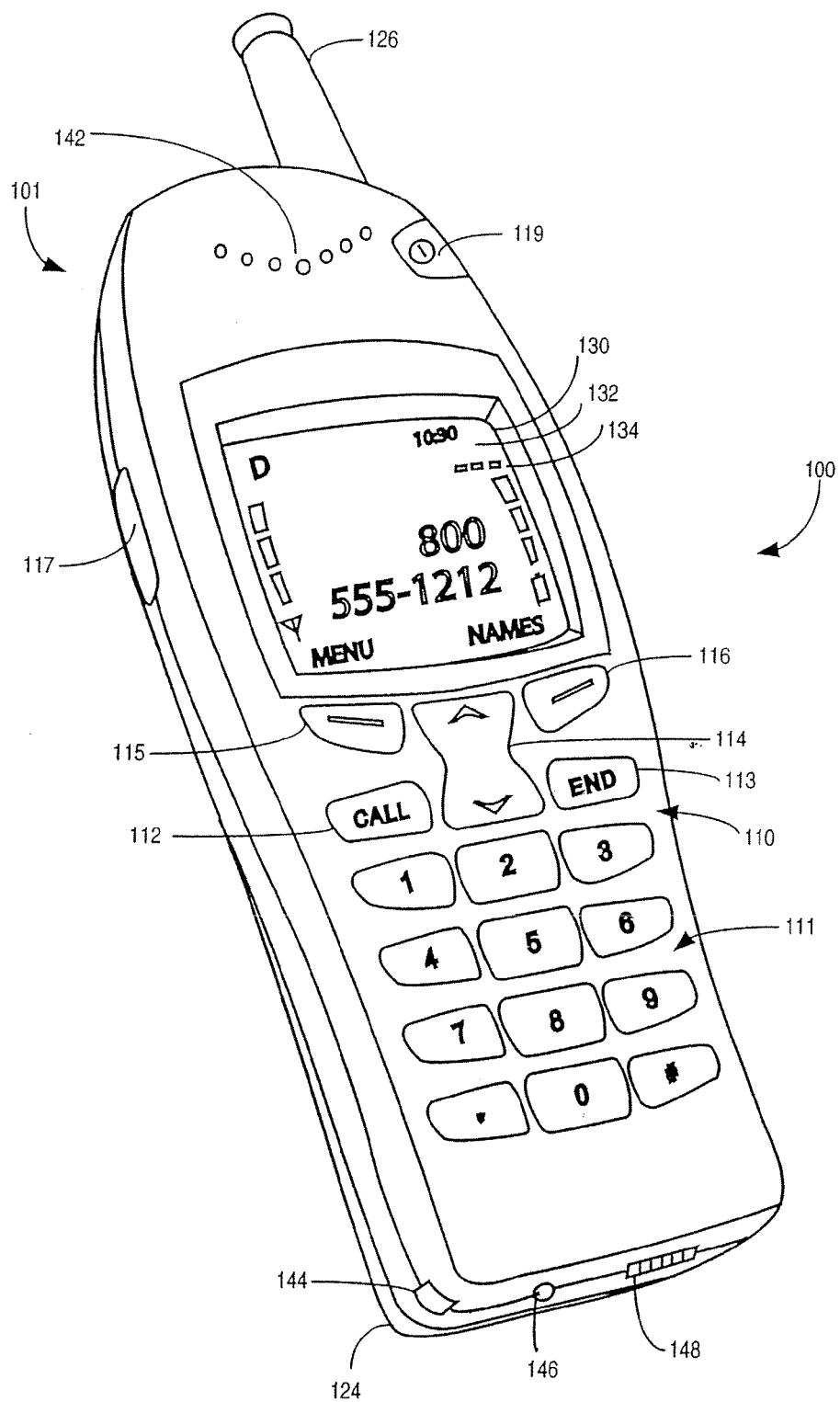
FIG. 1 is an illustration of a typical mobile station.
Figure 2:
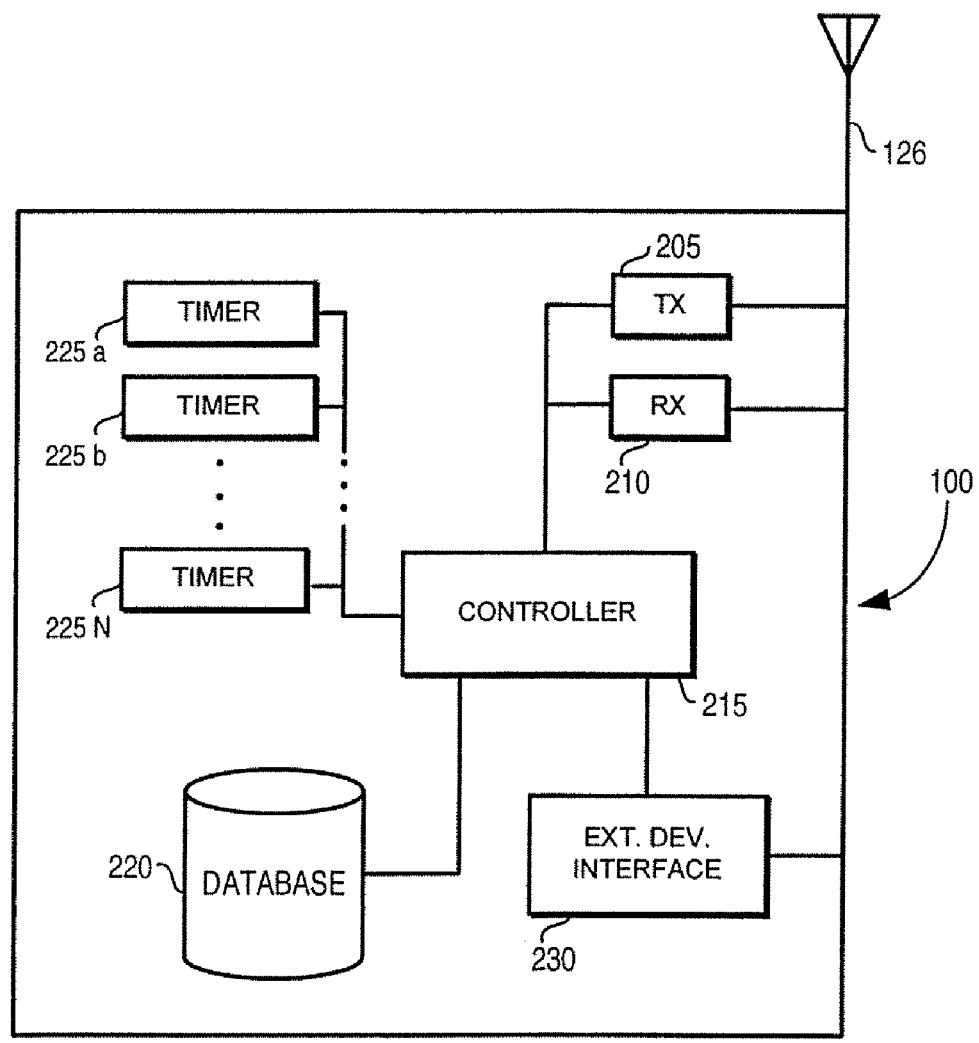
FIG. 2 is a simplified block diagram illustrating the basic internal components of mobile station in accordance with an embodiment of the present invention.

FIG. 2 is a simplified block diagram illustrating the basic internal components of mobile station 100 in accordance with an embodiment of the present invention. Mobile station 100 has an antenna 126 for radio communication. This communication is made possible through transmitter circuitry 205 and receiver circuitry 210, which operate under the control of controller 215 (which also controls other mobile station operations as well). In accordance with the illustrated embodiment of present invention, mobile station 100 also includes a plurality of timers (225a, 225b, ... 225n) to time the duration of events, as will be explained more fully below. These timers also operate under the control of controller 215. Note that although the plurality of timers are illustrated as separate blocks, the timing of several events simultaneously may in fact be performed by a single physical device.

Database 220 is a memory storage device that holds data being stored at the mobile station. In accordance with this embodiment of the present invention, this data includes project profiles that comprise information relating to the separate categories used in tracking productivity. A project profile may have sub-profiles for greater tracking detail. Each project profile itself may be associated, for example, with a single customer. It may also be an artificially-created entity used simply to keep track of certain miscellaneous activities. Database 220 also includes memory for storing (now) standard mobile-station data such as telephone directory and address information and personal calendars and appointment data. Associating items of this commonly-stored data with project profiles aids the tracking function of an embodiment of the present invention, and this associating information may also be stored n database 220. Note, however, that storing all of this information on database 20 is not required. Mobile station 100 is, after all, a communication device and may instead use its communication capability to store some of this information on a remote storage facility with which it is able to make contact. Finally external device interface 230 is a module that enables mobile station 100 to communicate with other devices through non-radio means, such as through a cable.

Figure 3:
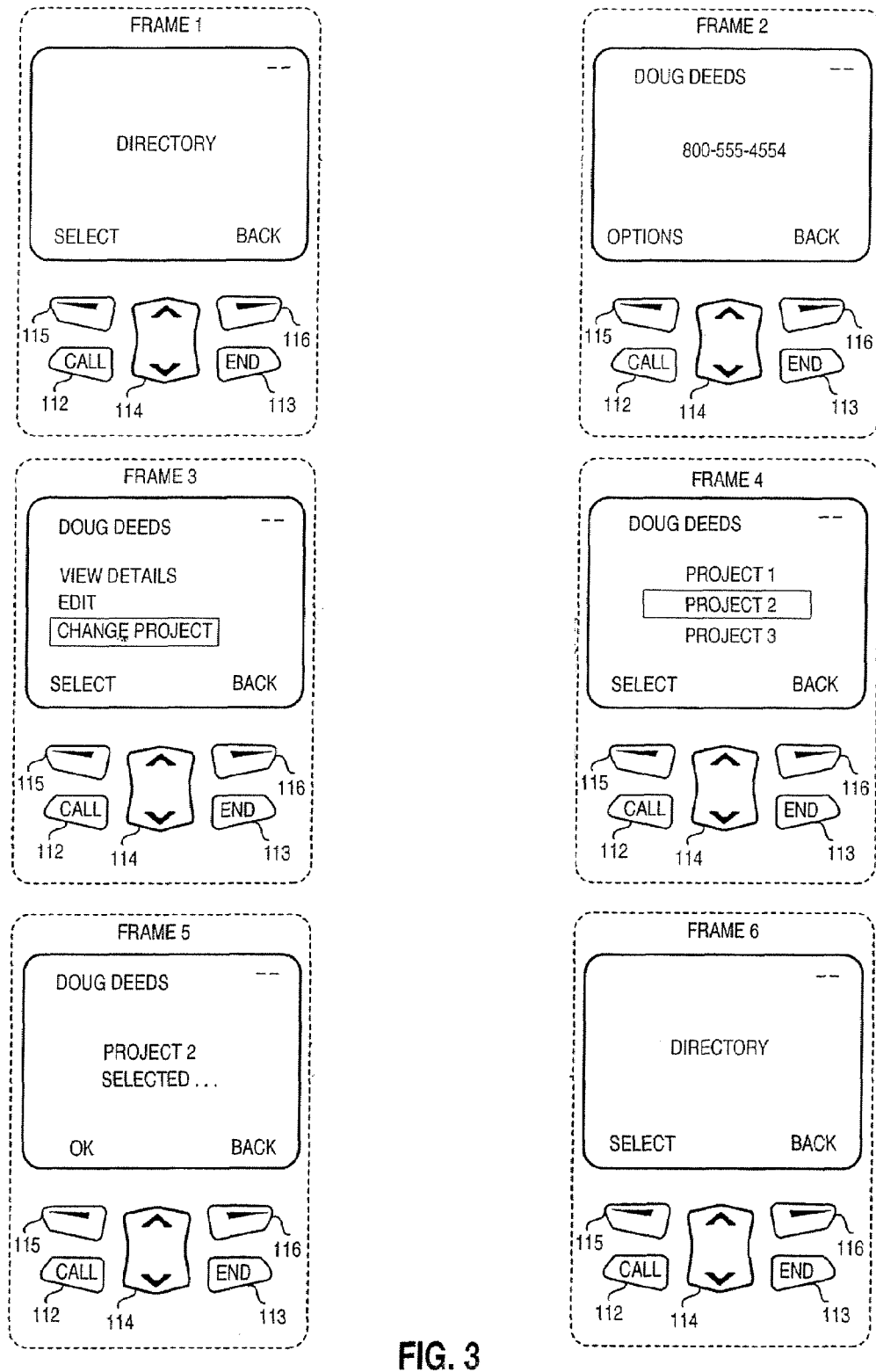
FIG. 3 is a series of illustrations showing an exemplary display sequence viewed while changing a project-profile association in accordance with an embodiment of the present invention.

FIG. 3 is a series of illustrations showing an exemplary display sequence (Frames 1–6) viewed while changing a project-profile association in accordance with an embodiment of the present invention. As should be apparent, these frames represent the graphic that might be viewed on display 134 of mobile station 100, with the call control, scroll, and function keys shown for reference. As mentioned above, users preferably associate names in the mobile-station telephone directory with specific project profiles. Frame 1 of FIG. 3 is an exemplary display from which the user may select the directory function (by pressing function key 115). The first item in the directory (or one to which the user has scrolled) is an individual and a telephone number shown in Frame 2. Selecting "options" (again with function key 115) results in several options being displayed.

From this display, the user might view other information or edit the phone number, but in Frame 3 the option "change project" is highlighted. Choosing "select" brings the user to Frame 4, upon which display a list of projects is shown. Using scroll key 114 to highlight "project 2" and the pushing the "select" function key 115 associates this individual with a project profile called "project 2". In this embodiment, a confirmation screen appears at Frame 5, giving the user an opportunity to confirm the selection or return to Frame 4. Selecting "OK" (function key 115) returns the user to the "directory" screen (shown in Frame 6, which is the same as Frame 1 in FIG. 3).

Similar sequences may be followed to associate calendar entries with specific project profiles, or to add or edit the project profiles themselves. Although setting up the profile and association data may actually follow the completion of an activity, the greatest advantage of implementing the present invention obtains when the setup is done in advance.

Figure 4:
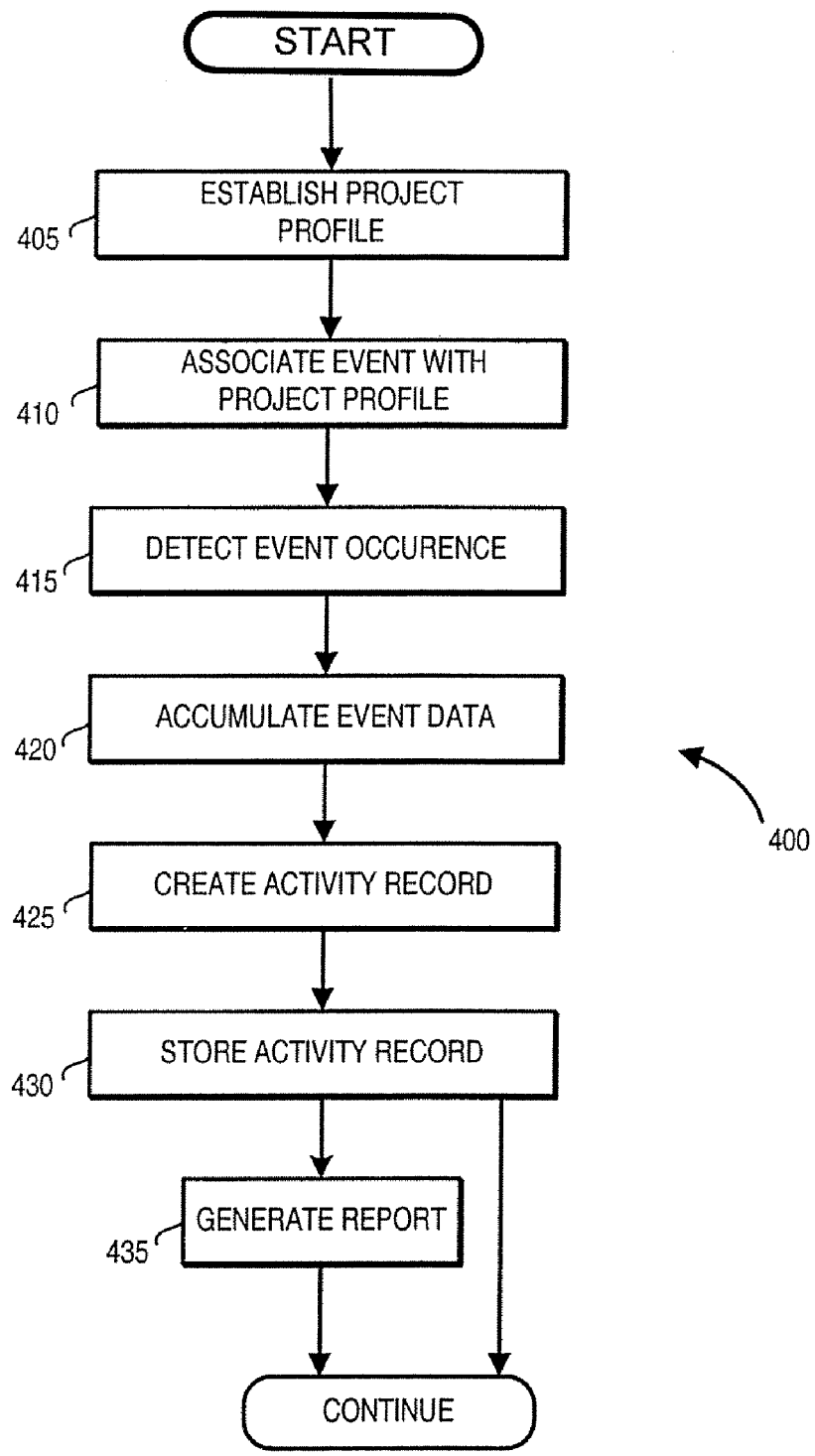
FIG. 4 is a flow diagram illustrating a method of tracking productivity on a mobile station according to an embodiment of the present invention.

FIG. 4 is a flow diagram illustrating a method 400 of tracking productivity on a mobile station according to an embodiment of the present invention. At START it is presumed that an operational mobile station has the data-storage capability, preferably in a data storage unit on the mobile station itself, for accommodating the data stored during the process. Note that in accordance with the present invention, these method steps may be performed in any logically permissible order.

In the embodiment of FIG. 4, however, the process begins with the establishment of a project profile, or of a number of project profiles (405). A project profile includes the identity of a particular project, and may include a number of sub-projects as well. The project and sub-projects are simply accounts for billing or tracking time. The manner in which these accounts are organized is of course up to the individual subscriber or other tracking entity.

Currently, many mobile stations include a 'profiles' feature that generally speaking includes a number of operational configurations, each with a set of customizable attributes such as ring type, ring volume, vibration alert quality, and so forth. Using a system of displayed menus, the user may choose one of these configuration for current use, and change configurations later as desired. For example, an 'outdoor' configuration may include a loud ring tone to alert the user of an incoming call while they are on a busy sidewalk. The mobile station may eventually be switched to a 'meeting' configuration that uses only a vibration announcement so that the user can be alerted to an incoming call without disrupting others.

The project profiles of the present invention are used for a different purpose than the operational configuration profiles, but can be organized and presented on the mobile station in the same fashion. They may also work together in certain embodiments of the present invention.

Returning to the embodiment of FIG. 4, the process continues with the step 410 of associating a mobile station item with a project profile. And item, as referred to above, may be a directory entry or address, or any other item for which productivity tracking may be related. Then, at step 415 the mobile-station event detector detects that a trackable mobile-station event is occurring. A mobile station event is any relevant change in state that might be indicative of an activity to be tracked. For example, a phone call may be a user activity that should be tracked. The mobile station events associated with this activity are the making (or receiving) of a call and the call's termination. Note that for the purposes of this disclosure, however, it does not matter whether the event is consider "engaging in a call", or two events "connecting" and "disconnecting" unless is is apparent from the context that a distinction is required. In either case, for the activity itself to be tracked, the event or an item associated with it must be associated with a project profile. In this regard, however, an activity can be tracked first and associated with a project profile at a later time.

Other types of events may be encountered, of course. The user may send an email or fax transmission from the mobile station, or an short message service (SMS) message. These events can also be tracked, although timing them (if desired) would proceed in a somewhat different fashion than with a telephone call. For example, when the user begins composing an email message, a timer could be started to mark the time it takes to create and send the message. An activity record could then be created with this elapsed time and the intended addressee. In a preferred embodiment, the timer would pause for interruptions, such as when a call has been received. For this purpose, it would also be preferable to have multiple timers (that is, the ability to simultaneously time multiple events). That way the elapsed time information can be included separately in an activity record for each event.

Items and events (and the corresponding user activity) can be associated with a project by reference to previously created associations. For example, each entry in a telephone directory or address book on the mobile station could be assigned to one or more projects. In this case, related a phone call or email will be automatically associated with the relevant project. If there are multiple possible projects, the user could be queried when the event terminates as to which project should be recorded in the activity record. Alternately, all possible projects might be recorded, and the user would edit out those that do not apply at some later time.

Meeting events would be handled somewhat differently. When a meeting has been scheduled in a calendar function on the mobile station, it can itself be associated with a project profile. Alternately the project profile could be deduced from a meeting location or the attendees list to the extent either have been entered. In some mobile networks, location-based services are available, meaning that the mobile station, itself or in cooperation with the network infrastructure, has the ability to determine mobile-station position with some degree of accuracy. A position might also be associated with a project profile, and tracking based on where the mobile station is operating from. Or position may just be additional data to be included in an activity record.

The meeting event might be considered to start and end on time, preferably subject to user confirmation. Alternately, the timer may not begin until the 'meeting' profile has been selected. As mentioned above, selecting this profile adjusts the operational configuration of the mobile station to be more conducive to the meeting environment. Selecting this profile might be a more accurate indication of when the meeting in facts starts. If this event trigger is used, a short alarm might be activated at the scheduled start and stop time for the meeting, or when the scheduled duration has passed, so as to remind a forgetful user to change the profile, and thus activate the timer function.

Note that where tracking determinations become highly automated, other reminders may be useful for alerting the user that tracking an event has commenced. For example, the display color scheme might be altered when tracking has started, and may even be customized to indicate by different colors the project profile currently being used. Start, stop, and pause functions could be added to give the user some control over the tracking function. Once an event is detected, data relating to the event (such as elapsed time or location) can be accumulated (step 420). The data being accumulated could be edited by the user before or after an activity record is created.

When appropriate, an activity record is created (step 425). This step is appropriate when enough information has been accumulated for form a desired record. The level of information required will vary as a matter of design preference. For example, a call might be recorded as two records, initiating and terminating, and each record can be made as the event occurs. More likely, however, the record will not be made until the call is terminated and its duration may be calculated and included in the activity record as well. The associated project profile will also be included in the activity record (unless the activity is as yet "unassigned"). Again, the user may enter the process to edit activity data as it is being collected, as it is stored in an activity record, or at a later time.

The activity record is preferably then stored (step 430) in a database or other memory device. Most of the time this database will be included in the mobile station itself, but could also be a remote database as well. Naturally, it could be stored on both. Storing activity records on a remote database would provide a backup and help to insure that the record is not lost if the mobile station is lost, stolen, or simply malfunctions. Storing records in a remote database might also may them more readily accessible to a third party, for example a supervisor, co-worker, or secretary, who might each have reasons to inquire as to which activities had taken place.

Alternately, the user may elect to periodically transfer stored activity records to provide backup or just to clear mobile-station memory space. When a user returns home or to the office, for example, a short range communication device (wireless or otherwise) might be used to transfer the accumulated activity records to a storage device such as a personal computer. The records may then be deleted from the memory of the mobile station.

Even if the activity records are not automatically stored at a remote site, the user may with to send them there. The records could be used to create one or more reports (step 435) consisting of all or a selected portion of the stored activity records. The report corresponding to a given project may even take the form of an invoice to be sent to a customer. Reports may be transmitted as an email message or in some other format.

Of course, if the activity records have been transferred to a PC, the reports could be prepared and transmitted (or simply printed out) from that device as well. This may be preferred where the reports can be edited prior to sending or printing, as the PC may well be a more suitable device for performing this task. Alternately, a PC-generated report based on activity records accumulated by the mobile station might be transmitted to the mobile station where it can be reviewed, approved, and eventually transmitted.

The preferred descriptions are of preferred examples for implementing the invention, and the scope of the invention should not necessarily be limited by this description. Rather, the scope of the present invention is defined by the following claims.

What is claimed is:

1. A method for tracking productivity using a mobile station, said method comprising the steps of:
   storing a list of contacts in the mobile station;
   storing on the mobile station at least one project profile corresponding to a contact on the list of contacts;
   associating a mobile-station event with the at least one project profile of the contact;
   detecting the occurrence of the mobile station event; and
   creating an activity record responsive to the detecting, the activity record having productivity information corresponding to the mobile station event associated with the contact.

2. The method for tracking productivity using a mobile station of claim 1, further comprising the step of storing the activity record on the mobile station.

3. The method for tracking productivity using a mobile station of claim 2, further comprising the step of querying the user for confirmation of the activity record.

4. The method for tracking productivity using a mobile station of claim 1, further comprising the steps of:
   determining that an event that has been detected is not associated with a project profile; and querying the user to enter the association.

5. The method for tracking productivity using a mobile station of claim 4, wherein the step of storing at least one project profile is performed after the determining step.

6. The method for tracking productivity using a mobile station of claim 1, wherein the at least one project profile comprises a plurality of project profiles.

7. The method for tracking productivity using a mobile station of claim 1, further comprising the step of transmitting the activity record.

8. The method for tracking productivity using a mobile station of claim 7, wherein the transmitting step comprises the step of formulating an email message.

9. The method for tracking productivity using a mobile station of claim 1, wherein the step of detecting comprises the steps of detecting when the event is initiated, detecting when the event is terminated, and calculating an elapsed time associated with the occurrence of the event.

10. The method for tracking productivity using a mobile station of claim 9, further comprising the step of adjusting the elapsed time.

11. A mobile-station productivity tracking system, said system comprising:
- a list of contacts;
- a project profile for storing information relating to projects for which productivity is to be tracked, wherein each project is associated with trackable events corresponding to a contact on the list of contacts;
- a detector for detecting when a trackable event corresponding to the contact is occurring;
- at least one timer for timing the detected trackable event corresponding to the contact;
- a database for storing productivity information of detected trackable events in association with the corresponding contact.

12. The mobile-station productivity tracking system of claim 11, wherein said at least one timer comprises a plurality of timers.

13. The mobile-station productivity tracking system of claim 11, further comprising a color display for indicating productivity-tracking information using variation in color.

14. The mobile-station productivity tracking system of claim 11, wherein the mobile station is capable of determining its location and relating it to detected events.

15. The mobile-station productivity tracking system of claim 11, further comprising a report generation module for generating reports based on stored event information.

16. The mobile-station productivity tracking system of claim 15, wherein the reports generated by the report generation module are in the form of emails to be transmitted by the mobile station.

* * * * *